(12) United States Patent
Raskar et al.

(10) Patent No.: US 6,755,537 B1
(45) Date of Patent: Jun. 29, 2004

(54) METHOD FOR GLOBALLY ALIGNING MULTIPLE PROJECTED IMAGES

(75) Inventors: Ramesh Raskar, Cambridge, MA (US); Jeroen van Baar, Brookline, MA (US); Paul A. Beardsley, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/393,686

(22) Filed: Mar. 21, 2003

(51) Int. Cl.[7] .................. G03B 21/26; G03B 21/00; H04N 9/12; H04N 3/22; H04N 3/26

(52) U.S. Cl. ................. 353/94; 353/122; 353/121; 348/383; 348/745; 349/5

(58) Field of Search ................. 353/69, 70, 94, 353/121, 122; 349/5, 7, 9; 348/383, 744, 745

(56) References Cited

U.S. PATENT DOCUMENTS 6,219,099 B1 * 4/2001 Johnson et al. ............. 348/383
6,456,339 B1 * 9/2002 Surati et al. ................ 348/745
6,525,772 B2 * 2/2003 Johnson et al. ............. 348/383

OTHER PUBLICATIONS

Raskar et al., "Multiprojector Displays using Camera-based Registration," IEEE Visualization, 1999.
Stork, Projection-based Augmented Reality in Engineering Applications, 2002.
Yang, "PixelFlex:A Recon-figurable Multi-Projector Display System," IEEE Visualization 01, 2001.
Raskar, "A Self Correcting Projector," IEEE Computer Vision and Pattern Recognition, 2001.
Chen et al., "Automatic Alignment of High-Resolution Multi-Projector Displays Using An Un-Calibrated Camera," IEEE Visualitization, 2000.
Lu et al., "Fast and globally convergent pose estimation from video images," IEEE Transactions on Pattern Analysis and Machine Intelligence 22, 6, pp. 610–622, 2000.

* cited by examiner

*Primary Examiner*—Russell Adams
*Assistant Examiner*—Melissa J Koval
(74) *Attorney, Agent, or Firm*—Dirk Brinkman; Andrew J. Curtin

(57) ABSTRACT

A method forms a cluster from a set of projectors. Each projector in the set includes a projector sub-system in a fixed physical relationship to a camera sub-system, and a communication sub-system for sending and receiving messages. A calibrate message is received in the projectors via the communications sub-system. A ready message is broadcast by the projectors using the communications sub-system. A structured pattern is projected sequentially by each of the projectors on a display surface using the projector sub-system. An input image of the structured pattern is acquired sequentially by each of the projectors using the camera sub-system. The projectors are globally aligned with each other and the display surface according to the input images.

16 Claims, 13 Drawing Sheets

100

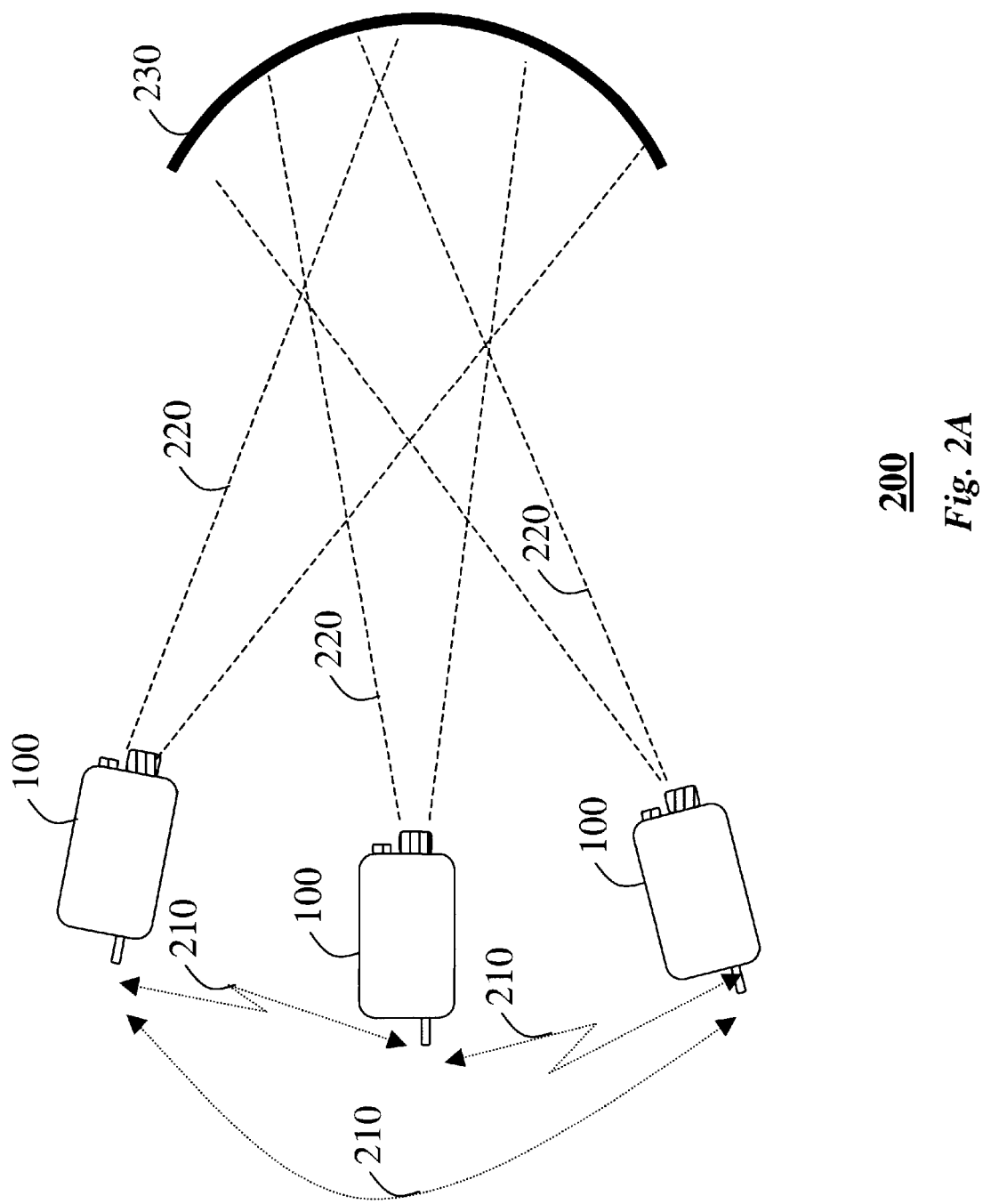

300

900

1100

1200

METHOD FOR GLOBALLY ALIGNING MULTIPLE PROJECTED IMAGES

FIELD OF THE INVENTION

This invention relates generally to projectors, and more particularly to aligning multiple projectors.

BACKGROUND OF THE INVENTION

The most exploited characteristics of a projector are its ability to display images that are larger in size than images produced by its CRT and LCD counterpart devices, and to place the images on arbitrary surfaces at a distance from projector. Like CRT and LCD based devices, projectors normally display flat, rectangular images. Unfortunately, many characteristics unique to projector-based displays are largely unexploited.

Because the projector is decoupled from the display surface, which is not the case in CRT or LCD devices, the size of the projector can be much smaller than the size of the image it produces. Overlapping images from multiple projectors could be effectively superimposed on the display surface, and images from projectors with very different specifications and form factors could be blended together. In addition, the display surface does not need to be planar or rigid, thus, many types of surfaces and merged projected images could be use to augment a physical environment.

Projector Trends

Projectors are getting smaller, lighter, brighter and cheaper. When devices get smaller, the flexibility in form factor spawns new modes of use and new applications. For example, future projectors could be used either in at fixed location or in a mobile setup.

Distributed, Commoditized Computing Trends

More and more, computation is distributed over clusters of heterogeneous, self-sufficient computing units rather than a set of well-organized mainframes. Advances in cheaper, more powerful computers accelerate this trend.

Similarly, in the projector system, it is desired to move away from large, monolithic, homogeneous systems to a network made up of heterogeneous, and self-sufficient projectors. Such projectors could be used in stand-alone mode, similar to PCs or PDAs, or operate cooperatively in clusters, similar to computing grids.

In the last few years, projectors have broken out of their traditional roles in entertainment, flight simulator, and presentation applications. Consequently, advances in projector-based systems are receiving greater attention, and projectors are started to be used for unconventional purposes.

Projector-Based Environments

Recently, display devices that augment the physical environment have become more popular, e.g., large monitors, projected screens, LCD or plasma screens for fixed installations, and handheld PDAs for mobile applications. Immersion is not a necessary goal of most of these displays.

Due to their shrinking size and cost, projectors are increasingly replacing traditional display devices and mediums, see Raskar et al., "Multiprojector Displays using Camera-based Registration," IEEE Visualization, 1999, Underkoffler et al., "Emancipated pixels: realworld graphics in the luminous room," SIGGRAPH 99 Conference Proceedings, pp., 385–392, 1999, Pinhanez, "The Everywhere Displays Projector: A Device to Create Ubiquitous Graphical Interfaces," Ubiquitous Computing, Ubicomp '01, 2001, Sukthankar et al., "Scalable Alignment of Large-Format Multi-Projector Displays Using Camera Homography Trees," Proceedings of Visualization, 2002, and Stork, "Projection-based Augmented Reality in Engineering Applications, 2002.

From a geometric point of view, those prior art projector systems use one or more environmental sensors assisting a central processing unit. The processing unit computes the Euclidean or affine relationships between a projector and a display surface.

In contrast, it is desired to provide a decentralized projector system based on individual self-contained projectors.

Some prior art projector systems provide automatic registration for seamless displays using a cluster of projectors, see Yang, "PixelFlex:A Reconfigurable Multi-Projector Display System," IEEE Visualization 01, 2001, and Brown at al., "A Practical and Flexible Large Format Display system," The Tenth Pacific Conference on Computer Graphics and Applications, pp. 178–183, 2002. However, those systems require environmental sensors, do not admit projectors beyond the range of any one sensor, and work only for first order planar surfaces.

It is desired to provide a projector that can display images on higher order surfaces such as cylinders and domes, without the use of environmental sensors.

Enhanced Projectors

Some prior art display systems use enhanced sensors and additional computation, see the "I/O bulb" as described by Underkoffler et al., above, which uses a co-located projector and camera. A tilt sensor can be used for automatic keystone correction, see Raskar, "A Self Correcting Projector," IEEE Computer Vision and Pattern Recognition, 2001.

It is further desired to provide projectors with network capabilities, and to make projectors geometrically aware and self-configurable, so that projectors can communicate with each other, and be sensitive to the physical shape of display surfaces and objects present in the environment.

SUMMARY OF THE INVENTION OVERVIEW

The invention provides a novel techniques that support a geometrically aware projector and self-configurable display systems composed of one or more of these geometrically aware projectors.

The invention also provides calibration and rendering techniques for displaying images on different types of surfaces and objects, in the presence of other projectors.

These techniques can be applied to traditional projector-based environments, and enable new types of applications and interfaces.

Therefore, it is an object of the invention to provide a shape-adaptive projector system. The shape adaptive, or geometrically aware projector displays images on planar or non-planar surface with minimum local distortion. The system handles a corresponding conformal projection problem, and variations to horizontal and vertical constraints.

It is also an object of the invention to provide a self-configuring ad-hoc projector cluster that can render what appears to be a single seamless image from multiple images projected by self-contained projectors, without using any environmental sensors.

It is an object of the invention to provide a method for globally aligning multiple images using master and Euclidean information for a scene. This includes a method for determining a largest inscribed rectangular image in a union of projected quadrilateral images, that is an arbitrarily shaped polygon.

It is an object of the invention to provide a projector system for displaying images on a curved display surfaces, specifically quadric surfaces. Therefore, a simplified parameterized transfer method is provided. To handle curved surfaces, the invention also provides a method for global aligning and registering images in the presence of small errors in pair-wise relationships due to distortion of projected images on curved surfaces.

BRIEF DESCRIPTION OF THE DRAWINGS

FIG. 2A is a block diagram of an self-configurable, ad-hoc projector cluster according to the invention;

DETAILED DESCRIPTION OF THE PREFERRED EMBODIMENT

Geometrically Aware Projector

Figure 1:
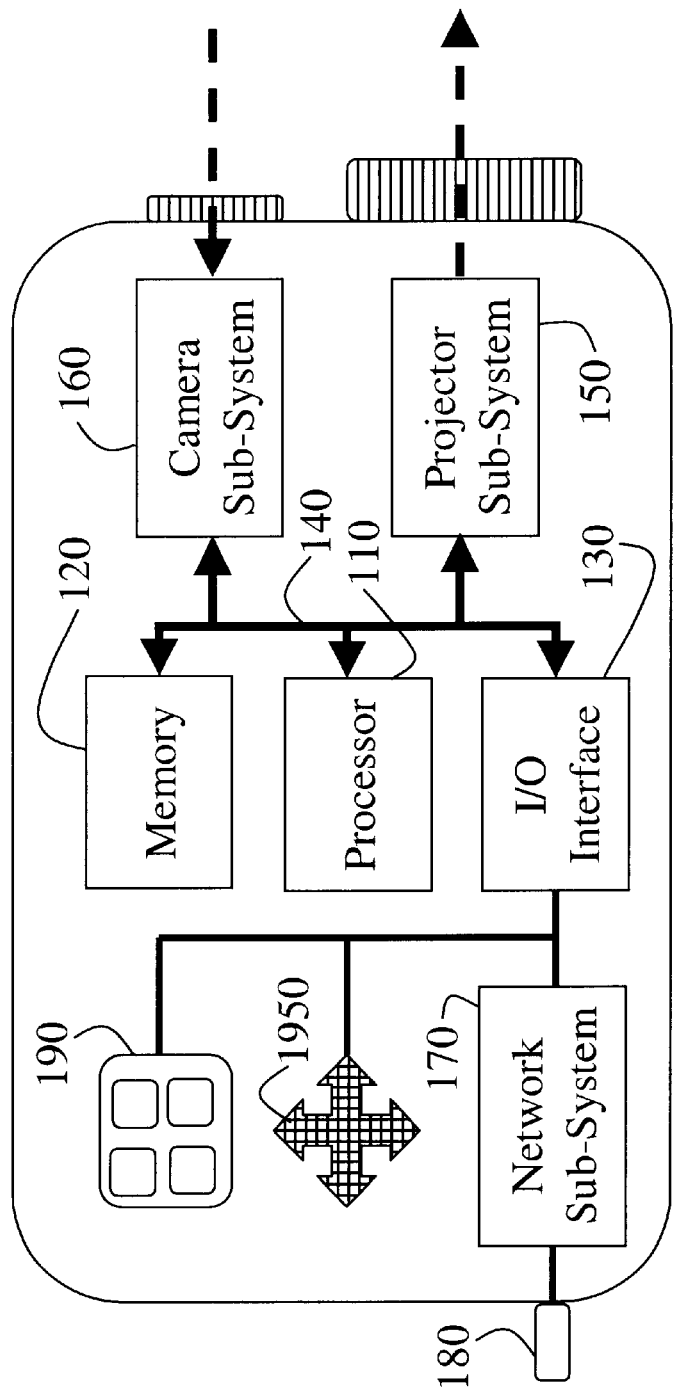
FIG. 1 is a block diagram of a geometrically aware projector according to the invention.

FIG. 1 shows a geometrically aware projector 100 according to our invention. It should be noted that the projector 100 can be used in both front and rear projection modes, and alone or in a cooperative combination with other similar projectors.

Our projector 100 includes a microprocessor 110, a memory 120, and an I/O interface 130 connected by buses 140, generally a processing unit. The processing unit is conventional in its electronic structure, but unconventional in its operation when performing the method steps described herein.

The projector also includes a projector sub-system 150 for displaying output images, and a camera sub-system 160 for acquiring input images.

A network sub-system 170 allows the projector to communicate with other similar devices, or other computing devices, local or remote. Therefore, the network system can be connected to an antenna or infrared transceiver 180, depending on the communications medium.

A user interface 190 can provide input and output data to facilitate operation of the projector. Internal sensors 195, e.g., tilt sensors or accelerometers can determine an orientation of the projector. It should be noted that the sensors are internal only, and do not sense the environment external to the projector.

Projector Operation

The projector 100 can perform a number of functions, including smart keystone correction, orientation compensated image intensities, auto brightness, zoom and focus, 3D scanning for geometry and texture capture, and smart flash for the camera sub-system 160. For this last function, the projector function is secondary to the camera function. Here, the projector merely illuminates specific areas in a scene observed by the camera.

A number of additional adaptive functions are described in greater detail below.

Because we do not wish to rely on any Euclidean information external to the projector, e.g., active beacons in a room, boundaries on display screens or human aid, we use a completely self-calibrating projector-camera stereo-pair to support a "plug-and-display" capability.

The projector 100 can communicate with other devices and objects in a scene to 'learn' required geometric relationships. The ability to learn these relationships dynamically, as the projector is operating, is in major contrast with prior art projectors that require a pre-configured geometric setup, complex calibration, communication and user assistance.

Prior art projector systems that use a simple planar homography and avoid complete calibration require some Euclidean information on the display surface, e.g., screen edges or markers, or assume the projector is in an "ideal" location, i.e., with the center-of-projection (CoP) substantially orthogonal to a planar display surface.

Self-Configurable Ad-Hoc Projector Cluster

Figure 2B:
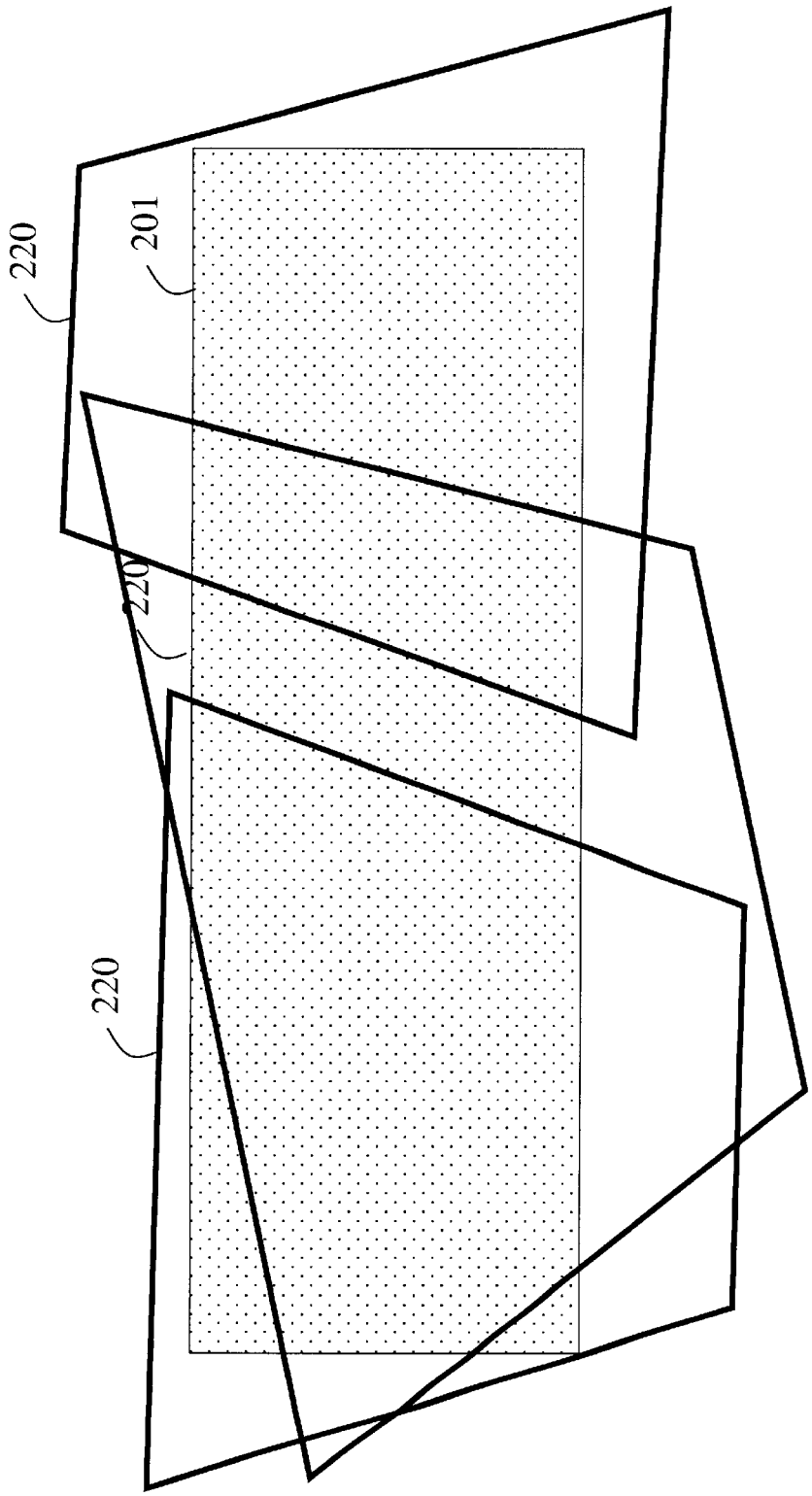
FIG. 2B is a block diagram of a composite image displayed by the cluster of FIG. 2A.

As shown in FIGS. 2A and 2B, the projector 100 can be used alone, or in a self-configurable ad-hoc networked cluster 200 of projectors communicating with each other via a network 210, such as wireless Ethernet, RF, or infrared. When configured as the cluster 200, the projectors 100 display what is perceived as a single seamless composite image 201, shown stippled in FIG. 2B. The composite image 201 is in fact composed of multiple projected image 220 on a display surface 230, or other physical objects. Note, the surface 230 can be a quadric surface. In this example, two projectors project from below, and one from above as observed by its inverted keystoning.

As described below, the placement of the projectors can be casual, that is the boundaries of the images do not have to be aligned. All that is required that a union of the projected images form an n-sided polygon on the display surface where perceived single composite output images are formed.

Shape-Adaptive Projector

When the projector 100 is used casually, possibly in a mobile setup, a planar display surface may not always be available. In fact, it may be desired to display images on room corners, columns, or dome shaped ceilings. Therefore, it becomes necessary to correct the output image so distortion is minimized. If multiple projectors are used, then it is a further problem to seamlessly merge multiple output image, perhaps produced by projectors that have incompatible illumination intensities. Note, this is different than the prior art problem where the output image is pre-warped for a single projector placed at an "ideal" location, i.e., with the center-of-projection (CoP) substantially orthogonal to a planar display surface.

We want to generate what appears to be a single output image that conforms to the shape of the surface. Three-dimensional cues are an integral part of human vision e.g., when viewing a poster on a curved wall from one side, or reading a label of a cylindrical object, or viewing a mural on a curved building. Therefore, we project output images, which are consistent with a normal visual experience.

Conformal Projection

Our method displays an image that has minimum distortion over the illuminated region of the display surface. For example, on a planar surface like a movie screen, the solution is to project images as if an audience is viewing the movie in a front-to-parallel fashion. If the projector is skewed, then keystone correction is applied.

For a curved surface, or a surface that is non-planar in general, we wish to 'wallpaper' the image or images onto the display surface, so that locally each point on the display surface is undistorted when viewed along the surface normal.

Because the surface normal can vary, we determine a conformal image, where a ratio of the areas in the output image and corresponding area on the display surface is fixed.

A zero-stretch solution is possible only when the surface is developable. Example developable surfaces are two planar walls meeting at a corner, or a segment of a right cylinder, i.e., a planar curve extruded perpendicular to the plane. In other cases, such as two planar walls and a ceiling meeting in a corner, or a partial sphere, we solve the minimum stretch problem in the least squares sense.

With our method, a scroll of the texture in the input image appears to be a smooth scroll on the illuminated surface without change in size or shape of the image regions. We determine a mapping for the 3D shape of the display surface by adapting a least squares conformal map (LSCM) described by Levy et al., "Least Squares Conformal Maps for Automatic Texture Atlas Generation, SIGGRAPH 2002 Proceeding, 2002. Levy is concerned with texture mapping triangles while rendering a flat image, however, we need to project images onto developable surfaces.

LSCM minimizes angular distortion and non-uniform scaling between corresponding regions on a 3D surface, and its 2D parameterization space. For a developable surface the solution is fully conformal. For a given point X on the 3D mesh, if the 2D texture coordinates (u, v) are represented by a complex number (u+iv), and the display surface uses coordinates in a local orthonormal basis (x+iy), then the goal of conformal mapping is to ensure that tangent vectors to the iso-u and iso-v curves passing through X are orthogonal, i.e., $$\frac{\partial u}{\partial x} = \frac{\partial v}{\partial y}, \text{ and } \frac{\partial u}{\partial y} = -\frac{\partial v}{\partial x}.$$

Levy et al. solve the problem on a per triangle basis, and minimize the distortion by mapping any surface homeomorphic to a disk with a (u, v) parameterization.

Planar Transfer Method

Figure 3:
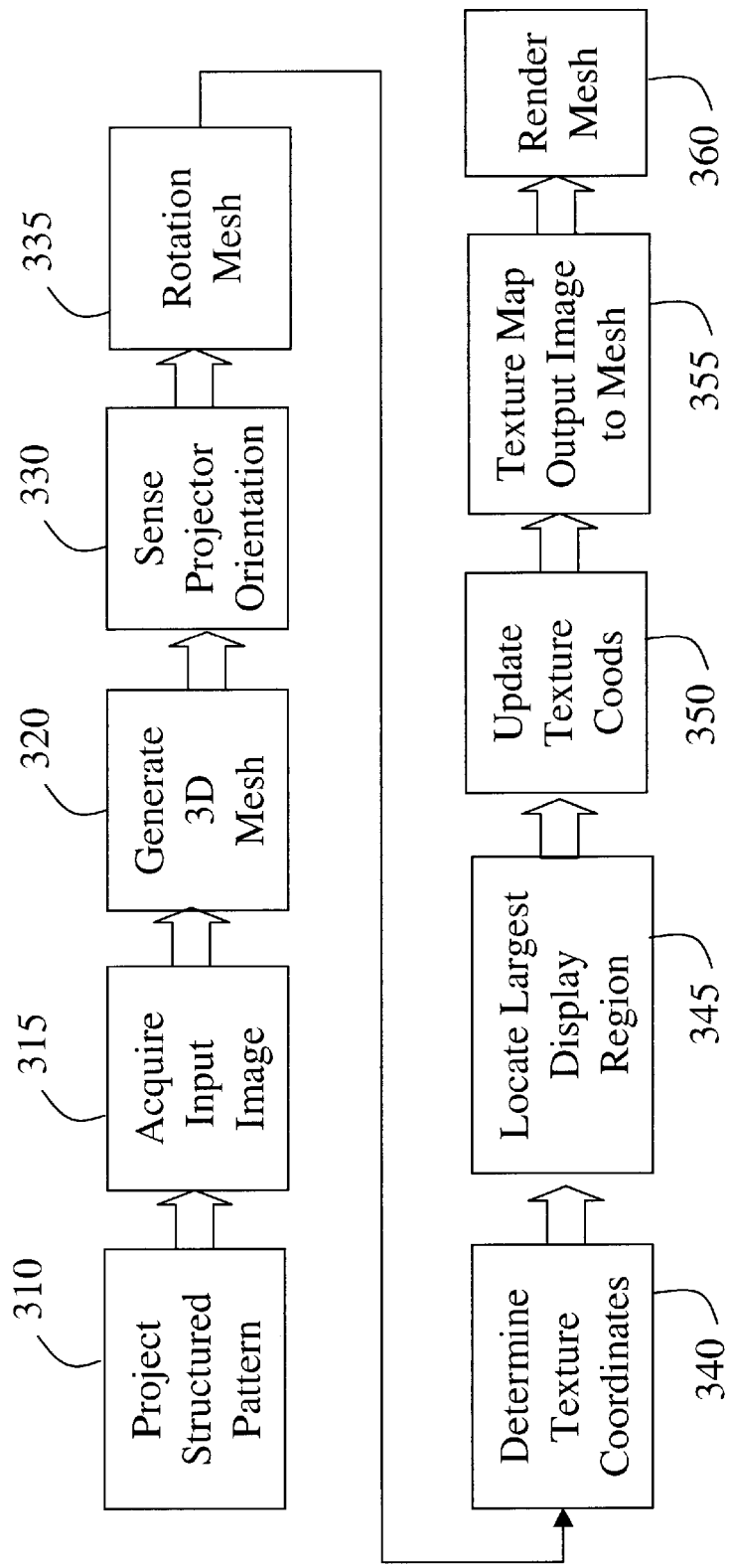
FIG. 3 is a flow diagram of a method for adaptively rendering an image with the projector of FIG. 1.

FIG. 3 shows the steps of our conformal projection method 300.

We begin by projecting 310 a structured pattern, e.g., a uniform checkerboard or square grid, onto a display surface by the projector sub-system 150. An input image of the structured pattern is acquired 315 by the camera sub-system 160.

From the shaped of the pattern in the input image, we generate 320 a 3D polygon mesh $D^p$, e.g., a mesh composed of triangles. The mesh is generated in a coordinate frame of the projector. The mesh will be distorted for developable or curved surfaces because it reflects the shape of the display surface.

An orientation of the projector, in a coordinate frame D of the display surface, is sensed 330 with the internal sensors 190, and we rotate 135 the mesh $D^p$ to be axis aligned with the coordinate frame D of the display surface.

Then, texture coordinates U are determined 340, using LSCM, thus finding a two-dimensional embedding $D^\Pi$ of the coordinate frame D in a Euclidean plane.

We locate 345 a displayable region, e.g., a rectangle, in the embedding $D^\Pi$ that is as large as possible and is as "upwards oriented" as possible in the coordinate frame D of the display surface, when the largest region is projected onto the display surface, and update 350 the texture coordinates accordingly to fit the display region.

Then, an output image is texture mapped 355 onto the onto the mesh $D^p$, using the texture coordinates U, and the mesh is rendered 360, from the viewpoint of the projector, onto the display surface. Conventional hardware or software-based techniques can be used to render the textured triangles.

In step 345, we try to find an orientation $R^{tex}$ of the output image in the (u,v)-plane. If we assume that the display surface is part of a vertical right cylinder, i.e., vertical extrusion of a curve in the horizontal plane, such as corners where vertical walls meet or pillars, then our goal is to align a vertical axis of the output image, when projected onto the display surface, with the vertical axis of the display surface.

Furthermore, we use the orientation of the projector in the coordinate frame of the display surface, which is the reason for using the internal sensors 190. If the surface is not a vertical right cylinder, e.g., domes, then our solution aligns the output image in the least squares sense.

Orientation Method

Figure 4:
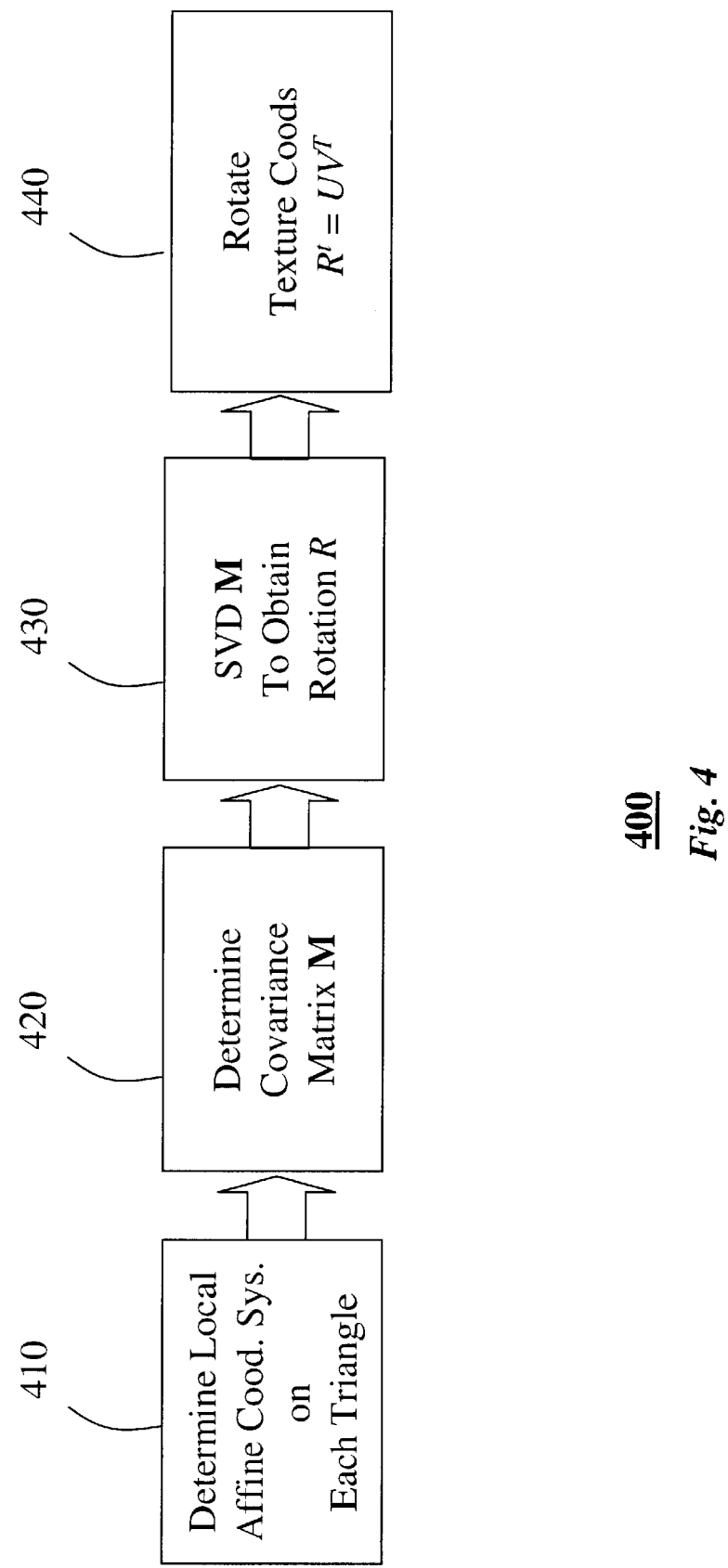
FIG. 4 is a flow diagram of a method for determining an orientation of an output image to be projected.

As shown in FIG. 4, the steps to determine the 2D orientation $R^{tex}$ are as follows.

On each triangle $t_j$ in the mesh with vertices $p_1, p_2, p_3$, in 3D, we first determine 410 a local affine (2D) x-y coordinate system $$X = p_1 + x(p_2 - p_1) + y(p_3 - p_1).$$

We find a vector corresponding to a projection of the vertical axis of the display surface on the triangle $t_j$ by solving $$[0\,1\,0]^T = x_j(p_2 - p_1) + y_j(p_3 - p_1),$$

in the least-squares sense.

We want to align all $[x_j, y_j]$ to $[0, 1]$ in texture space, which involves a 2D rotation and a translation. Therefore, after normalizing the vector $[x_j, y_j]$, we determine 420 the covariance matrix $$M = \sum_j [x_j \; y_j]^T [0 \; 1].$$

We apply 430 a singular value decomposition to the matrix $M=USV^T$ to obtain the desired 2D rotation as $R^t=UV^T$.

Finally, we rotate 440 all the texture coordinates using $U_{vertical}=R^{tex} \, UT$.

Illuminating Vertical Surfaces

Sometimes, it is desirable to maintain the shape of image features in one direction at the cost of distortion in other directions. For example, banner text projected on a near-vertical but non-developable surface, such as a sphere-segment, should appear with all text characters of the same height even if the characters are distorted in the horizontal direction.

Therefore, we modify the LSCM technique to take into consideration this new constraint. Because the notion of the vertical is encoded in the rotation due to readings by the sensors 190, we can change a cost function for least squares conformal maps. We express additional constraints on the four partial derivatives in the form:

$$\text{weight} \cdot \frac{\partial v}{\partial y} - \text{const.}$$

Typically, only one such constraint is used. For example, the above constraint keeps stretch along the vertical direction to a minimum, i.e., the equation penalizes and minimizes the variance in $$\frac{\partial v}{\partial y}$$

over all triangles. Note that, in this case, the local orthonormal x,y-basis on the triangles are selected such that the x-axis points along the horizontal everywhere on the display surface.

The above conformal projection method can be used for a number of display surface, includes displays with two and three planar portions meeting in a corner, a "W" shaped surfaces, and a non-developable surface, such as a concave dome.

Cluster of Projectors

Figure 5:
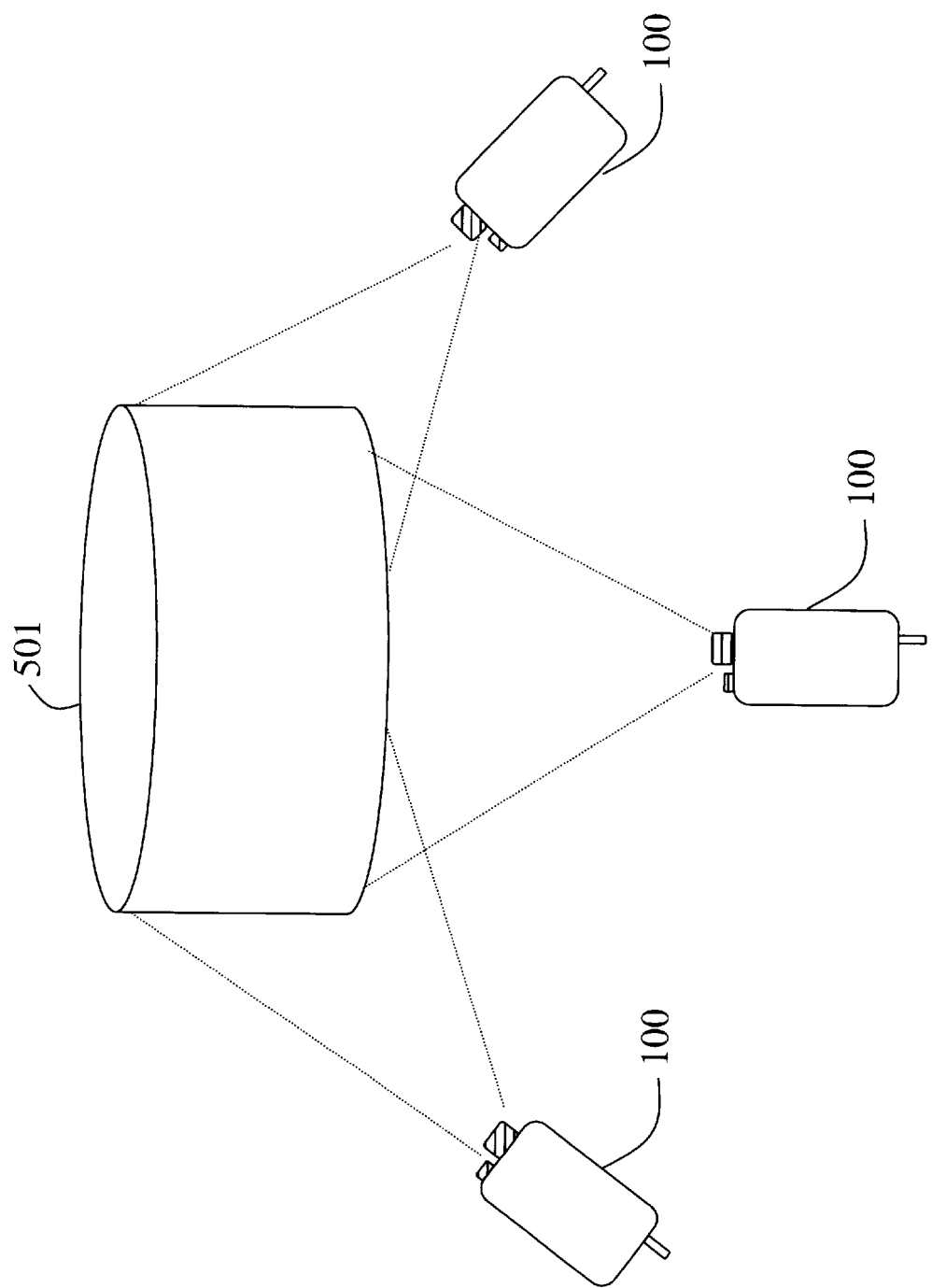
FIG. 5 is a block diagram of a cylindrical object augmented by a cluster of projectors.

As shown in FIG. 5, the cluster 200 of our geometrically aware projectors 100 can be used to render on planar and curved display surfaces 501.

The ad-hoc cluster of projectors 200 has several advantages. The cluster operates without centralized management, so individual projectors can enter and exit the cluster dynamically. The cluster does not require external environmental sensors, and displays images beyond the range of any one of the internal sensors.

We describe the basic operation of the cluster 200 in the context of a planar display surface. For higher order display surfaces, such as quadric surfaces, we provide a novel quadric transfer method.

Planar Display Using Ad-Hoc Clusters

Seamless multi-projector overlapping displays with the ad-hoc clusters 200 offers many advantages. The cluster allows very wide aspect ratios, see FIG. 2 and short distance between projectors and display surfaces. We can also use heterogeneous projectors and higher order surfaces. By heterogeneous projectors we mean projectors that have different display characteristics, e.g., light intensity, aspect ratio, and pixel resolution. The cluster allows a higher pixel resolution and brighter display. In addition, multiple clusters can also be used.

Prior art systems that exploit casually aligned projectors with camera-based registration use homographies in different projector views induced due to the display plane. The homography relationships along with some Euclidean frame of reference is used to pre-warp images so that the displayed images appear geometrically registered and undistorted on the display.

However, projecting images with wide aspect ratios has been a problem. We overcome this problem by using a novel global alignment method that relies on a pair-wise homographies between a projector sub-system of one projector and the camera sub-system of a neighboring projector.

Multiple distributed cameras, which are in a close position to view the projected images at similar pixel resolution ratios, allow us to compute the pair-wise homographies. The pair-wise homographies are used to compute a globally consistent set of homographies for the cluster by solving a linear system of equations. This leads to improved pixel registration.

The global alignment operation is performed without requiring significant pre-planning or programming. This is possible because every projector acts independently and performs its own observations and calculations, in a symmetric fashion. Euclidean information, such as corners of the screen or alignment of the master camera, is not required. The internal sensors and cameras allow each projector to be geometrically aware, and projectors can dynamically enter and exit the cluster. Whereas, prior art multi-projector display systems are difficult to set up and manage.

Forming a Cluster

Figure 6:
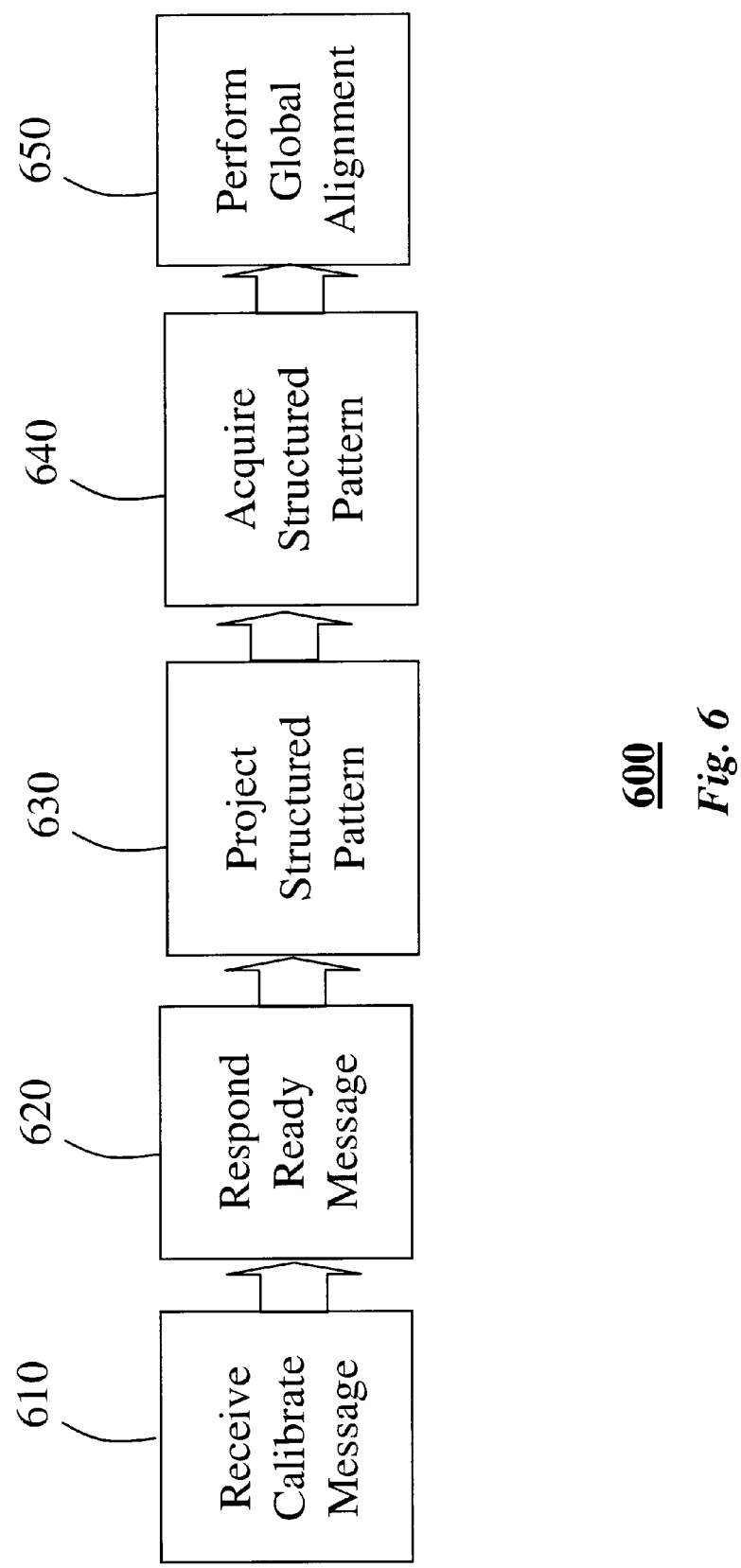
FIG. 6 is flow diagram of a method for forming the cluster of FIG. 2.

FIG. 6 shows a method 600 for forming the cluster 200 of projectors. The method responds to receiving 610 a 'calibrate' message. The calibrate message can be broadcast by a projector $U_k$ that wants to join the cluster 200. Alternatively, the calibrate message can be broadcast by any projector already in the cluster when its orientation has changed according to the sensors 190. In addition, the message can be broadcast by some other source in the environment to indicate, for example, that the display surface has changed shape or orientation. Of course, the message can also be broadcast after the user has casually placed the projectors, and the cluster needs to be formed in its first instantiation. The message is received via the proximity network 210, such as wireless Ethernet, RF, or infrared in all the m projectors in the vicinity.

This puts the cameras of all the m projectors $U_i$, $i=1, \ldots, m$ in attention mode and all of the receiving projectors respond 620 by broadcasting a 'ready' message.

At this point, the projectors, project sequentially 630 a structured pattern, which is visible to one or more of the m cameras $C_i$, $i=1, \ldots, m$, embedded in the projectors of the cluster 200. Any number of communication protocol techniques can be used to synchronize the sequential projection of the structured pattern.

If any one camera from the existing cluster acquires 640 the projected pattern, then the entire cluster performs 650 global alignment to include projector $U_k$, or any other projector. The alignment includes determining pair-wise geometric relationships between the projectors in the cluster, as described below.

If a particular camera cannot acquire a pattern, it is assumed that a projector is in the vicinity but its projected pattern does not overlap with the extent of the image displayed by the cluster. However, the method does not require that all projectors see all patterns. Without a loss of generality, it is assumed that the cluster now includes n projectors.

Pair-wise Geometric Affine Relationship

Figure 7:
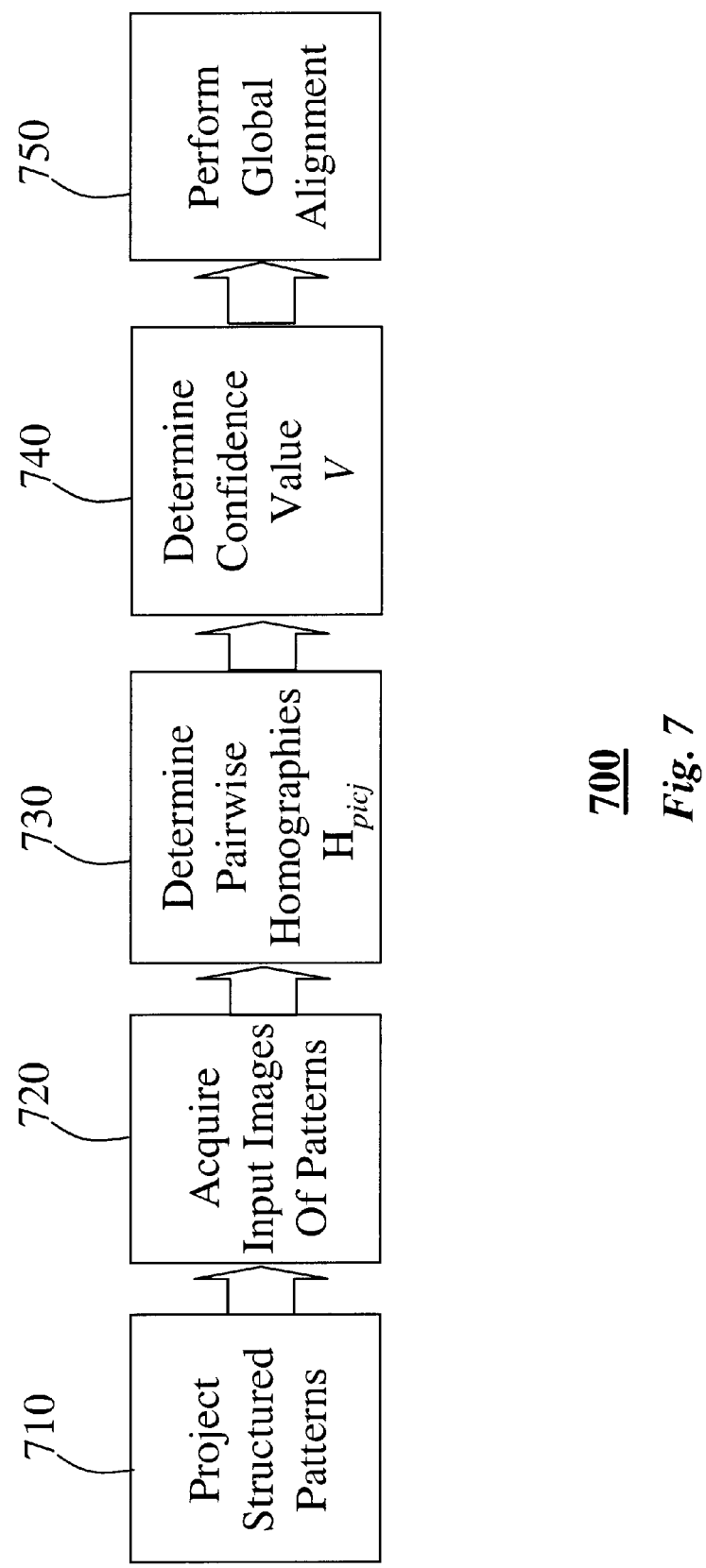
FIG. 7 is flow diagram of a method for globally aligning images projected by the cluster of FIG. 2.

As shown in FIG. 7, we perform image registration of overlapping images. The relationship between the images is expressed as a homography. The mapping between two arbitrary perspective views of an opaque planar surface in 3D can be expressed using a planar projective transfer, expressed as a 3×3 matrix defined up to a scale.

The eight degrees of freedom can be computed from four or more correspondences in the two views. In addition, due to the linear relationship, homography matrices can be cascaded to propagate the image transfer.

Using the network 210, a projector $P_k$ directs each projector $P_i$ in the cluster to project a structured pattern, e.g., a uniform checkerboard, one at a time.

The projected image is concurrently acquired by the camera 160 in each projector in the cluster. This allows the projectors to determine pair-wise homographies $H_{picj}$ for transferring the structured pattern from projector $P_i$ into the input image in camera $C_j$. A confidence value V is also determined 740.

Each projector's pair-wise homography, $H_{pi,pj}$, along with a confidence value, is calculated indirectly as $H_{pici}H^{-1}_{pjci}$. For simplicity, we write this as $H_{ij}$. The confidence value V is related to the percentage of overlap of the structured patterns on the display surfaces. The confidence value is used during global alignment.

Because we use a uniform checkerboard pattern, a good approximation of the confidence value is a ratio $r_{ij}$ of (the number of features of the structured pattern of projector $P_j$ acquired by camera $C_i$) to (the total number of features in the pattern of projector Pj). We find a confidence $h_{ij}=r^4_{ij}$ to be a good metric. The value is automatically zero if the camera $C_i$ did not see the pattern displayed by projector $P_j$.

Global Alignment

In the absence of environmental sensors, we compute the relative 3D pose between the display screen and all the projectors to allow a seamless, single displayed image. Without a known pose, the computed solution is correct up to a transformation by a homography and appears distorted on the display surface. Further, if the surfaces are vertical planes, then our approach automatically aligns the projected image with their horizontal and vertical axes.

However, to compute the 3D pose for global alignment 750, we avoid low confidence information such as stereo calibration and tilt-sensor parameters of projectors, and exploit relatively robust image space calculations such as the homographies determined above.

Thus, we first compute globally consistent homographies. A set of homography transforms cascaded along a cycle $$\prod_{i=0}^{k-1} H_{(i+1\%k)(i)}$$

should equal identity. Here, the '%' symbol indicates the modulo operator. This is seldom the case due to uncertainty in feature location. Thus, the goal is to generate a meaningful mosaic in the presence of minor errors.

A simple solution would use a single camera viewing the display region, and would perform computation in that space. When a single camera cannot view the whole display, a minimum spanning tree-based approach can be used. There, the projectors are nodes connected to overlapping projectors by edges of the graph, keeping only a minimal set of homographies. By using a projector near the center of the display as the root node of the tree, that approach is useful in reducing the number of cascaded homographies, and thereby, reducing the cumulative error.

Instead, our method 700 finds a globally consistent registration by using information from all the available homographies. Cumulative errors due to homography cascading are concurrently reduced with respect to a selected reference frame or plane by solving a linear system of equations derived from independently computed pair-wise homography matrices. Our method is adapted from a method described by Davis, "Mosaics of scenes with moving objects," IEEE Computer Vision and Pattern Recognition (CVPR), pp. 354–360, 1998.

We modify that method to consider the confidence $h_{ij}$ in measured pair-wise projector homography $H_{ij}$. A global homography $G_i$ transfers output image $I_i$ in from projector $P_i$ into the global reference frame. This can also be expressed as a transfer of image $I_i$ to image $I_j$, with the homography $H_{ij}$ followed by transfer to the global frame with the global homography $G_j$ as:

$$G_j H_{ij} \cong G_i.$$

Thus, where each homography $H_{ij}$ is known, we build a sparse linear system of equations to compute the unknown global transfers.

Because, each homography is defined up to a scale factor, it is important that we normalize so we can directly minimize $|G_j H_{ij} - G_i|$. The normalized homography determinant is 1 i.e., $\hat{H}=H/(\det|H|)^{1/3}$. We omit the 'hat' for simplicity. We further scale individual linear equations by the confidence in the homography $H_{ij}$ computed as $h_{ij}$ above. Thus, the set of equations are, for each i, j is:

$$H_{ij}(G_j H_{ij} - G_i) = 0.$$

If the number of independent pair-wise homographies is larger than the number of projector projectors, then the system of linear equations is over constrained and solving it in a least squares sense. This produces a set of global registration matrices that minimally deviate from the set of calculated pair-wise projections.

After pair-wise homographies are exchanged, each projector performs the global alignment 750 separately, in parallel, by treating its own image as the reference plane. At this stage, the solution for the global image transfer and screen aligned projection is known up to an unknown homography, $H_{i0}$, between each projector $P_i$ and the display surface.

Euclidean Reconstruction

In the absence of Euclidean information from the environment, we find $H_{i0}$ by computing the 3D pose of projector $P_j$ with respect to the screen. Although pose determination in 3D is noisy, our image transfer among projectors remains the same as before, i.e., based on global transfer ensuring a seamless single output image. Our approach to determine the homography $H_{i0}$ is based on a method described by Raskar et al., "A Self Correcting Projector," IEEE Computer Vision and Pattern Recognition (CVPR), 2001.

Figure 8:
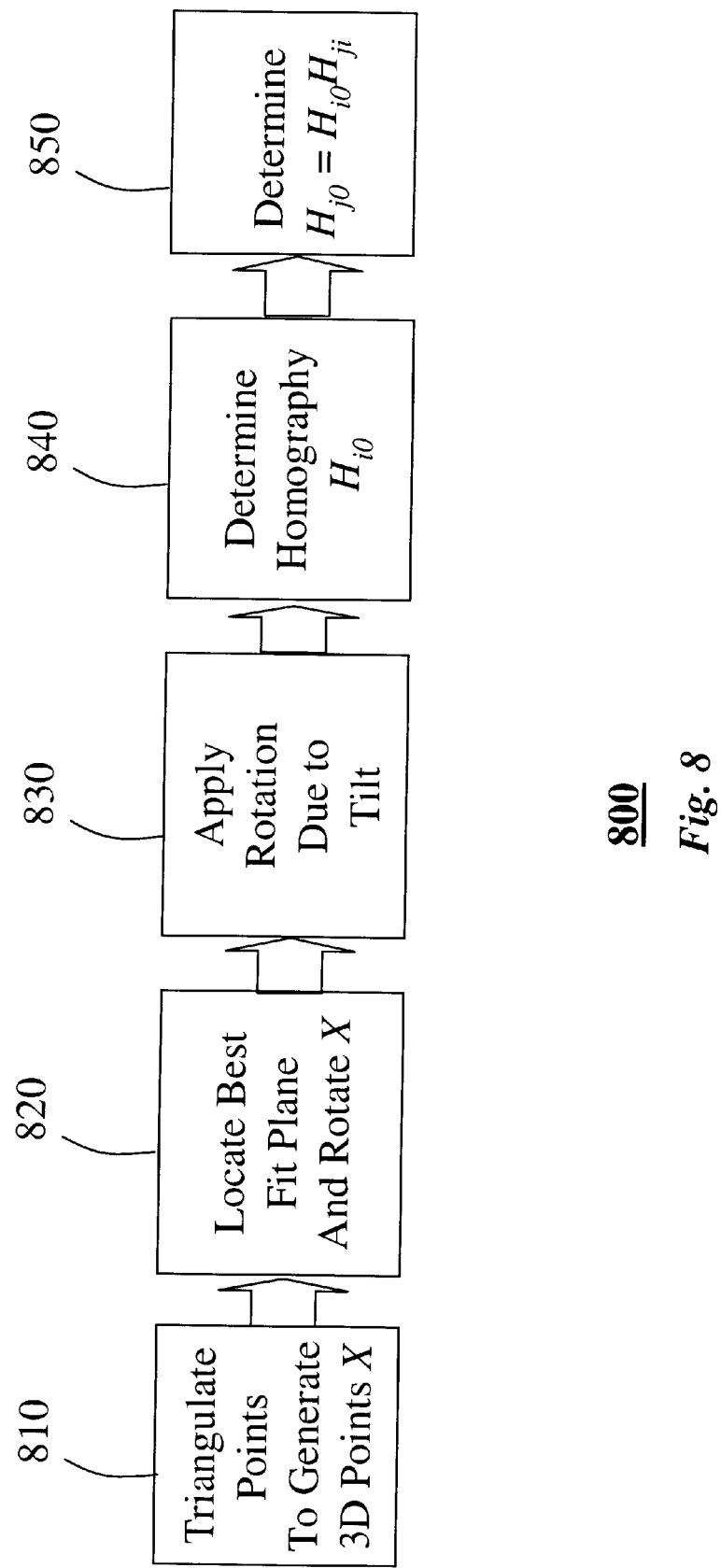
FIG. 8 is a flow diagram of a method for determining a Euclidian reconstruction in the projector of FIG. 1.

As shown in FIG. 8, our method 800 for performing the reconstruction in parallel by each projector $P_i$.

The steps are as follows. Triangulate 810 corresponding points in projector $P_i$ and camera $C_i$ image space to generated 3D points $X=\{x_1, x_2, \ldots\}$.

Locate 820 a best fit plane, and transform X by a rotation, $R^\pi$, between local coordinates, where the display plane is z=0.

Apply 830 the rotation due to tilt, $X_0=R^{tilt}R^\pi X$, so that $X_0$ is now aligned, i.e., the z coordinate is 0. Points in the vertical plane of the display surface have the same x coordinates, and points in a horizontal plane have the same y coordinates.

Determine 840 the homography $H_{i0}$ that maps the image of point X in projector $P_i$ to corresponding points in $X_0$, ignoring the z-value.

Finally, for all other projectors, determine 850 the homography $H_{j0}=H_{i0}H_{ji}$, where $H_{ji}$ is the global homography $G_j$ computed by projector $P_i$.

Rendering

Figure 9:
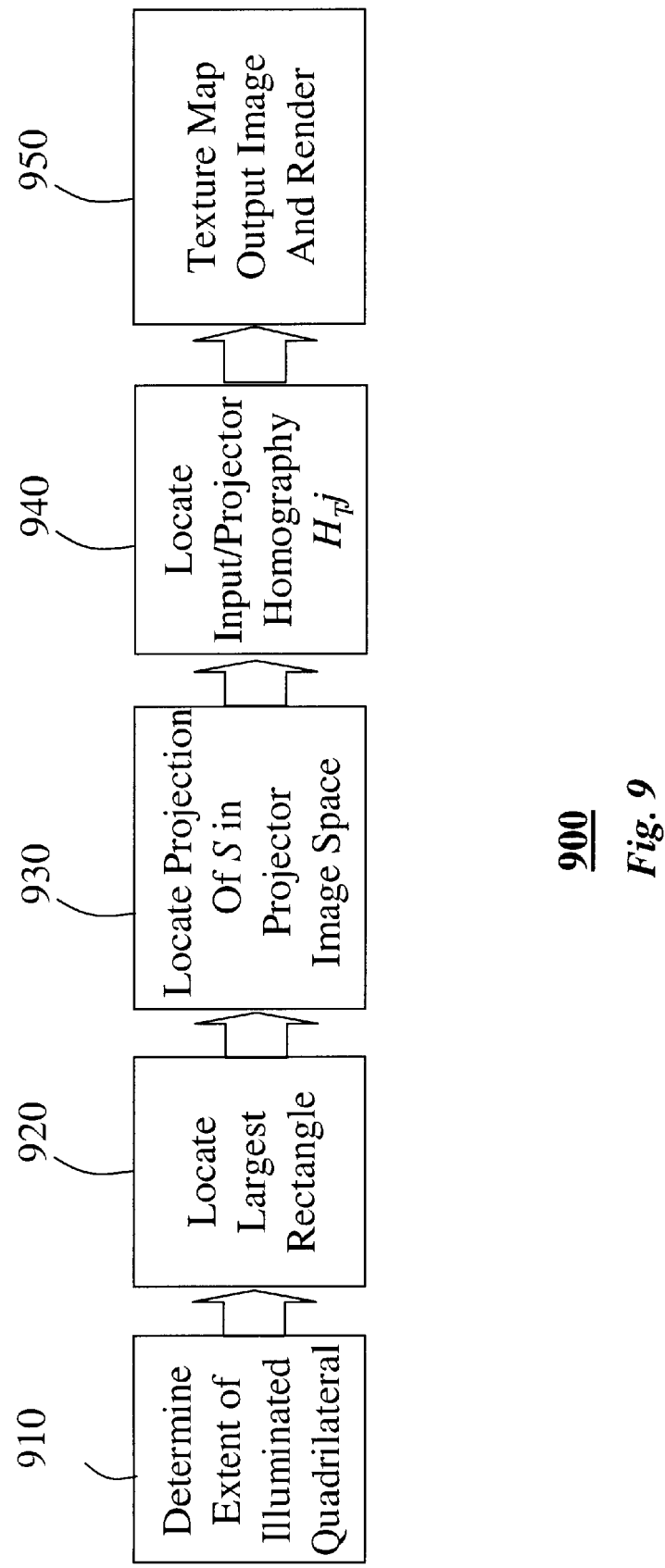
FIG. 9 is a flow diagram of a method for rendering with the projector of FIG. 1.

As shown in FIG. 9, finding a suitable projection matrix for rendering for a projector involves first computing the region of contribution of the projector on the screen and then re-projecting that complete display extent into the projector image.

In the first step, we determine 910 an extent of a quadrilateral illuminated by a projector in the cluster. The extent is in screen-aligned ($X_0$) coordinates. Therefore, the four corners of the normalized projector image plane [±1±1] are transformed using $H_{j0}[\pm 1 \pm 1 \ 1]^T$.

The union of all projected quadrilaterals in screen $X_0$ space is, possibly, a concave planar polygon, L.

We next locate 920 a largest rectangular image S that will fit inside the polygon L, as described below.

Each of the n projectors calculates a slightly different $S_i$, depending on errors in Euclidean reconstruction of $X_0$. For a global agreement for S, we take the weighted average for each of the four vertices of $S_i$. The weight is the distance of the projector $P_i$ from that vertex.

In the second step, we locate 930 a projection of the corners of the rectangle S in the projector image space using $H_{j0}^{-1}$. Note that the re-projected corners of the rectangle S will most likely extend beyond the physical image dimensions of the projector. Because the rectangle S represents the displayable region, it indicates the extents of the input image, T, to be displayed. Therefore, pixels in the output image beyond this extent are not illuminated.

Thus, we can locate 940 the homography between output image and its projection $H_{Tj}$.

Last, we texture map 950 the output image onto a unit rectangle of the correct aspect ratio, and render with a projection matrix derived from $H_{Tj}$.

Where the images overlap, intensity blending is implemented using an alpha-channel in graphics hardware. The blending weights are assigned proportional to a distance to the image boundary. All steps are performed symmetrically in all of the projectors.

Largest Inscribed Rectangular Image in Polygon

Figure 10:
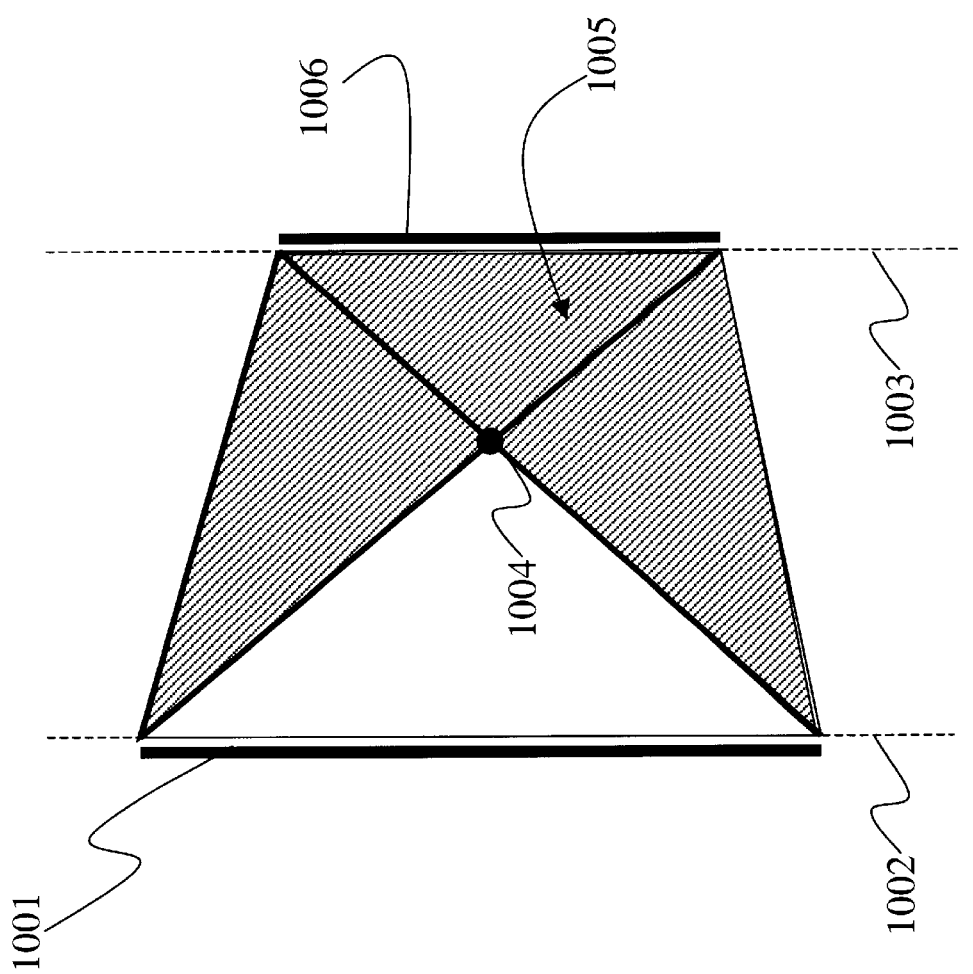
FIG. 10 is a block diagram for finding a largest inscribed rectangular image in an illuminated arbitrarily shaped polygon.

FIG. 10 shows how to locate a largest axis-aligned rectangle S with a predetermined aspect ratio a inside a, possibly concave, polygon L 1001. The polygon L is formed by the union of the projected quadrilaterals. The solution for the three unknowns, two for position and one for scale of the rectangle S, can be obtained by stating the inequalities. The equations are slightly different for concave polygons.

We provide a simple re-parameterization of the problem.

The polygon L 1001, shown edge on, is drawn in a first depth plane 1002 with a depth value z=1, and a rectangle, R 1006, of aspect ratio a is drawn in a second z=0 depth plane 1003. A center of projection 1004, W=0 (x, y, z), with z in the range [0, 1], to map rectangle R into a rectangle S in the z=1 plane, is considered valid if the rectangle S remains completely inside the polygon L. The depth planes can be stored in a depth buffer.

We locate a center of projection (CoP) with minimum depth z because it defines the largest inscribed rectangle S.

Consider the forbidden zones 1004, shown shaded, for W. Any CoP, that is inside the set of pyramids, created by a point on the polygon L with rectangle R as a base is invalid.

We construct pyramids that connect edges of the polygon L with edges of the rectangle R. Because the faces of the pyramid connecting the planes z=0 and z=1 are all triangles, our method computes the intersection of each triangle triple, and retains the triangle with a smallest z value.

We only need to consider two types of triangles, those connecting a vertex of the polygon L with an edge of the rectangle R, and those connecting an edge of the polygon L with a vertex of the rectangle R. as shown in FIG. 10.

For the n-sided polygon L 1001, e.g., in FIG. 2n=14, we have 8n triangles, with a complexity of $O(n^4)$. This is clearly sub-optimal in comparison to an $O(n^2)$ method, see P.K. et al., P.K., "Largest placements and motion planning of a convex polygon," 2nd International Workshop on Algorithmic Foundation of Robotics, 1996. However, our method is relatively easy to implement in a few lines of code. Because n is O(number of projectors), run-time of our method is still negligible.

For example, when the projectors are placed casually and aimed at a general area where the projected images should occur. It takes about five seconds per projector to find pair-wise homographies. Global alignment, inscribed rectangle and blending weights computations take an additional three seconds. For six casually installed projector cluster, it takes about thirty seconds to form an operation cluster.

Curved Display Using Ad-Hoc Clusters

In this section, we describe a method for automatically registering images on quadric surfaces, such as domes, cylindrical screens, ellipsoids, or paraboloids. Some prior art methods are known in computer vision for using quadric surfaces for image transfer, see Shashua et al., "The Quadric Reference Surface: Theory and Applications," International Journal of Computer Vision (IJCV), 23(2), 185–198, 1997.

In multi-projector systems, several methods have been described for seamless multi-projector planar displays based on planar transfer, i.e., planar homography, relationships, see Chen et al., "Automatic Alignment of High-Resolution Multi-Projector Displays Using An Un-Calibrated Camera," IEEE Visualization, 2000, and the PixelFlex system, see Yang et al. above.

However, there we are not aware of any techniques for parameterized warping and automatic registration of higher order surfaces. This is appears to be an omission because quadric surfaces do appear in many shapes and forms in projector-based displays. Large format flight simulators have traditionally been cylindrical or dome shaped, planetariums and OmniMax theaters use hemispherical screens, and many virtual reality systems use a cylindrical shaped screen.

In the prior art, alignment is generally done manually. Sometimes the manual process is aided by projecting a 'navigator' pattern, see Jarvis, "Real Time 60 Hz Distortion Correction on a Silicon Graphics IG," Real Time Graphics 5, 7 pp. 6–7, February 1997. Some multi-projector systems that use a curved display screen treat screen segments to be piecewise planar.

We provide a completely automatic method that is similar to the planar method described above. Our parametric method leads to reduced constraints on camera resolution, better tolerance to pixel localization errors, faster calibration, and much simpler parameterized warping process.

We re-formulation the quadric transfer problem, and use the solution in an application for a seamless display.

Simplification of Quadric Transfer

Mapping between two arbitrary perspective views of an opaque quadric surface Q in 3D can be expressed using a quadric transfer. While planar transfers can be computed from four or more pixel correspondences, the quadric transfer T requires nine or more correspondences.

If a homogeneous point X in 3D is expressed as a 4×1 vector, and the point X lies on the quadric surface Q, which is expressed as a symmetric 4×4 matrix, then $X^T Q X = 0$, and the homogenous coordinates of the corresponding pixels x and x in two views are related by:

$$x' \cong Bx - (q^T x \pm \sqrt{(q^T x)^2 - x^T Q_{33} x})e.$$

Given pixel correspondences (x, x'), this equation is traditionally used to compute the unknowns: the 3D quadric $Q = [Q_{33} q; q^T 1]$, a 3×3 homography matrix B and e, the epipole in homogeneous coordinates. This form used by Shashua et al., and even more recent work contains 21 variables, see Wexler et al., "Q-warping: Direct Computation of Quadratic Reference Surfaces," IEEE Conf. on Computer Vision and Pattern Recognition (CVPR), June, 1999. That is four more than are actually needed.

Our method is based on a simple observation. We can remove part of the ambiguity by defining $$A = B - eq^T \text{ and } E = qq^T - Q_{33},$$

and obtain the form we use:

$$x \cong Ax \pm (\sqrt{x^T E x})e.$$

Here $x^T E x = 0$ defines the outline conic of the quadric surface in an unprimed (x) view and A is the homography via a polar plane between the primed (x') view and the unprimed (x) view.

Apart from the overall scale, our form contains only one ambiguous degree of freedom resulting from a relative scaling of E and e. This ambiguity can be removed by introducing an additional normalization constraint, such as E(3,3)=1. Further, the sign in front of the square root is fixed within the outline conic in the image.

For cameras, the prior art method for directly calculating the quadric transfer parameters i.e., A, E and e, from point correspondences involves estimating the quadric, Q, in 3D, see Shashua et al. Another linear method for cameras uses a triangulation of corresponding pixels, see Cross et al., "Quadric Surface Reconstruction from Dual-Space Geometry," Proceedings of 6th International Conference on Computer Vision, pp. 25–31, 1998. If the internal parameters of the two views are not known, then all the calculations are done in projective space after computing the fundamental matrix.

However, we observe that when projectors, rather than cameras are involved, the prior art linear method produces very large reprojection errors, in the order of 20 or 30 pixels for XGA projectors. The computation of the fundamental matrix is inherently ill-conditioned given that the points on the quadric surface illuminated by a single projector do not have significant depth variation in most cases.

Therefore, we use known internal parameters and estimated Euclidean rigid transformations. Hence, unlike the planar case, computation of accurate image transfer in this case, involves three-dimensional quantities early in the calculation.

Quadric Transfer Method

Figure 11:
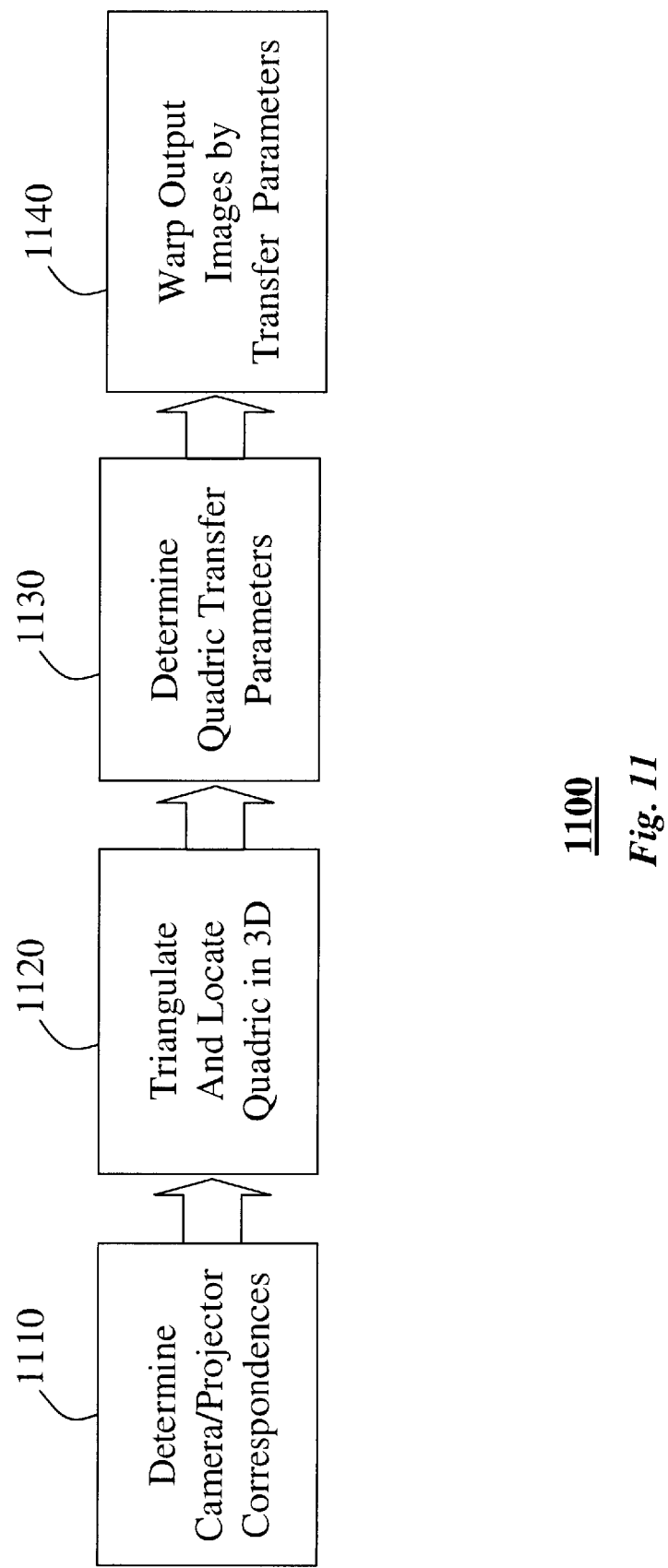
FIG. 11 is a flow diagram of a method for determining a quadric transfer for the projector of FIG. 1.

Our method 1000, as shown in FIG. 11, first determines 1110 correspondences between cameras and projectors. Next, we triangulate and generate 112 the equation of the quadric transfer in 3D. Then, we determine the quadric transfer parameters, and use the quadric transfer to warp 1140 the input images.

As in the planar cluster case, each projector Pk, k=1, . . . , n projects a structured pattern on the quadric, one at a time. The pattern is viewed by cameras $C_i$, i=1, . . . , n. However, we cannot directly find the quadric transfer $T_{Pick}$ without first finding a rigid transformation $\Gamma_{Pi}^{Ck}$ between projector $P_i$ and camera $C_k$.

Figure 12:
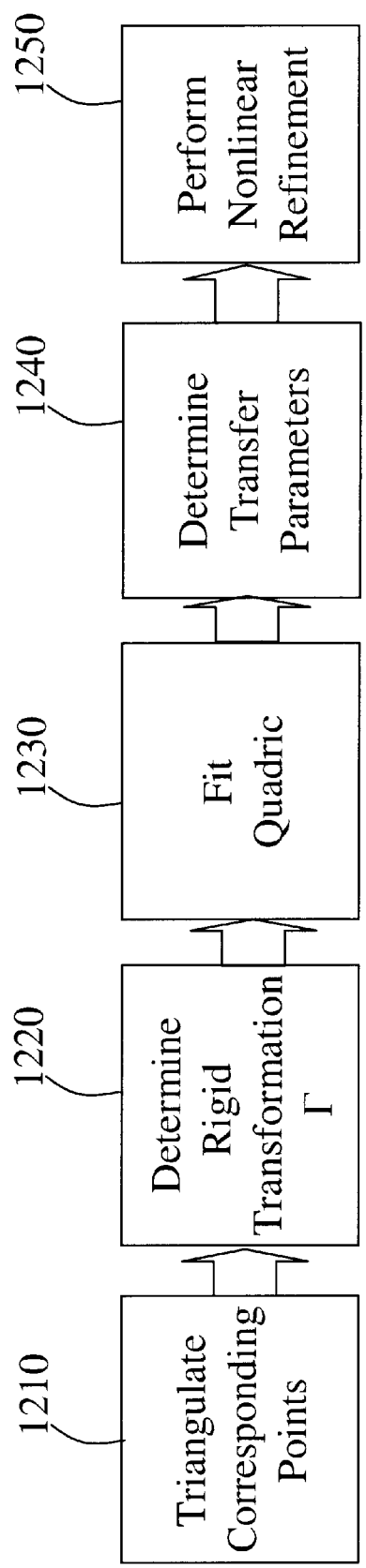
FIG. 12 is a flow a flow diagram of a method for determining a rigid transform for the projector of FIG. 1.

FIG. 12 shows the steps for a camera $C_k$. Because $\Gamma_{Pi}^{Ck}$ is known, we triangulate 1210 corresponding points in projector $P_i$ and camera $C_i$ to obtain 3D points $D_i$, on the display surface, and store the points in camera's $C_i$ coordinate system.

Given the points $D_i$ projected by projector $P_i$, and corresponding points observed by camera $C_k$ of neighboring projectors, we determine 1220 the rigid transform $\Gamma_{Pi}^{Ck} = \Gamma_{Pi}^{Ck} \Gamma_{Pi}^{Ci}$.

Then, we fit 1230 a 3D quadric transfer $Q_i$ to the points $D_i$ in the coordinate system of $C_i$.

We determine 1240 the transfer parameters $A_i$, $E_i$, and $e_i$ from $Q_i$, the projection matrices $M_{ck}$ and $M_{pi}$, and pixel correspondences, using our formulation of the simplified quadric transfer.

Last, we perform 1250 nonlinear refinement of the transfer parameters $A_i$, $E_i$, and $e_i$ to minimize pixel reprojection error.

Note that finding the pose of a camera from known 3D points on a quadric is error-prone because the 3D points are usually quite close to a plane. Because we know the camera internal parameters, we first make an initial guess for the external parameters based on a homography, and then use an iterative procedure to correct the guess, see Lu et al., "Fast and globally convergent pose estimation from video images," IEEE Transactions on Pattern Analysis and Machine Intelligence 22, 6, pp. 610–622, 2000.

Rendering

For rendering, we treat the quadric transfer as a homography via the polar plane, i.e., A, plus a per-pixel shift defined by E and e. Similar to the cluster for the planar display, without the aid of any external environmental sensor or Euclidean markers in the scene, we exploit this homography along with the internal sensor reading at the projector $U_k$ to align the output image with the horizontal and vertical axes of the display surface.

Given the relationship between the output image and the input image acquired by camera $C_k$, as well as the quadric transfer between camera $C_k$ and all projectors $P_i$, I=1, ..., n, each projector warps the output image into its own image space. Note that warping an image using a quadric transfer is different than the prior art rendering quadric surfaces as known in the prior art, see Watson et al., "A fast algorithm for rendering quadratic curves on raster displays," Proc. 27th Annual SE ACM Conference, 1989.

We perform the rendering using a simple vertex shader procedure or graphics hardware. For each projector, we map the output image as a texture onto a rectangularly shaped, densely tessellated triangle mesh, and compute the projection of each vertex of the mesh using the quadric transfer.

Our system and method are ideal for single or multi-projector seamless displays without expensive infrastructure. New applications enabled by our invention include low-cost and flexible dome displays, shopping arcades, and displays on cylindrical columns or pillars. Our approach can also be treated as an intermediate step between planar to arbitrary free form shaped displays.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for forming a cluster from a set of projectors, each projector in the set including a projector sub-system in a fixed physical relationship to a camera sub-system, and a communication sub-system for sending and receiving messages, comprising:

receiving a calibrate message in each projector using the communications sub-system;

broadcasting a ready message from each projector using the communications sub-system in response to the calibrate message;

projecting sequentially in each projector a structured pattern on a display surface using the projector sub-system;

acquiring sequentially in each projector an input image of the structured pattern using the camera sub-system; and aligning globally the projectors with each other and the display surface according to the input images.

2. The method of claim 1 further comprising:

placing the projectors so that a union of the structured light patterns and the input images form a polygon.

3. The method of claim 1 wherein for a particular structured pattern a subset of the projectors acquire the image.

4. The method of claim 1 wherein the aligning is performed concurrently in the set of projectors.

5. The method of claim 1 wherein the structured pattern is a checkerboard pattern.

6. The method of claim 1 further comprising:

locating a largest rectangle inside the polygon; and compositing a single perceived display image from a plurality output images in the largest rectangle according to the global alignment.

7. The method of claim 1 wherein the set of projectors is heterogeneous.

8. The method of claim 7 wherein the projectors have different display characteristics.

9. The method of claim 8 wherein the different display characteristics include intensity, aspect ratio and pixel resolution.

10. The method of claim 1 wherein the display surface has a quadric order.

11. The method of claim 1 further comprising:

determining a plurality of homographies, each homography for transferring the structured pattern from one projector into the input image of another projector.

12. The method of claim 11 further comprising:

assigning a confidence value to each homography.

13. The method of claim 12 wherein the confidence value is related to a percentage of overlap between the structured image of the one projector and the input image of the other projector on the display surface.

14. The method of claim 13 wherein the confidence value is a ratio of a number of features of the structured pattern of the one projector acquired in the input image of the other projector to a total number of features in the pattern of the one projector.

15. The method of claim 6 further comprising:

aligning the single perceived display image with a horizontal axes and a vertical axes of the display surface.

16. The method of claim 12 further comprising:

determining a global homography for transferring an output image from the one projector to a global reference frame.

* * * * *